UNITED STATES PATENT OFFICE.

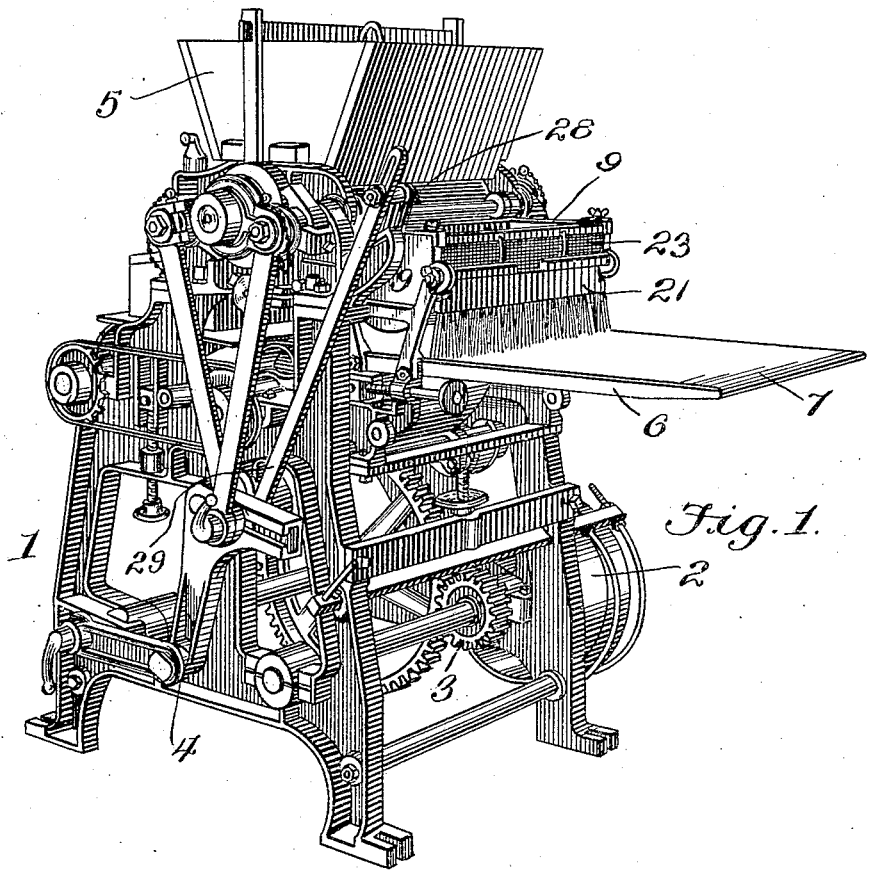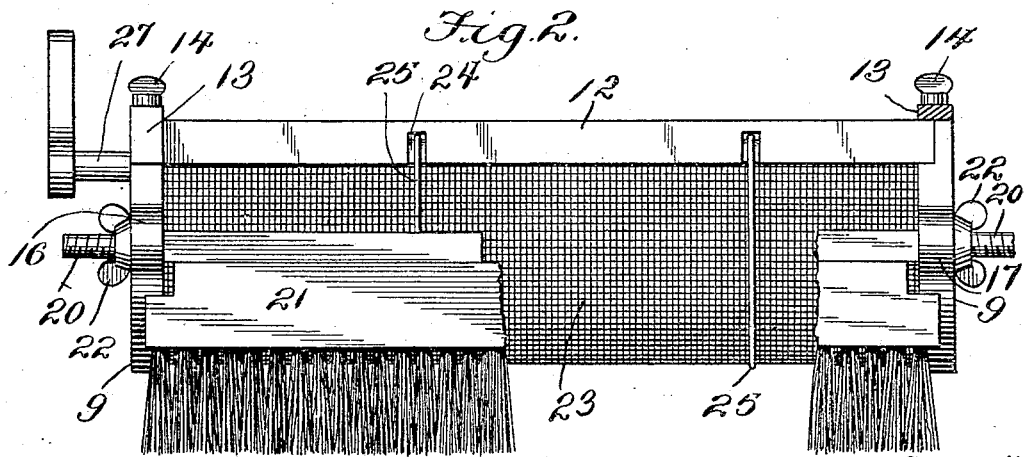

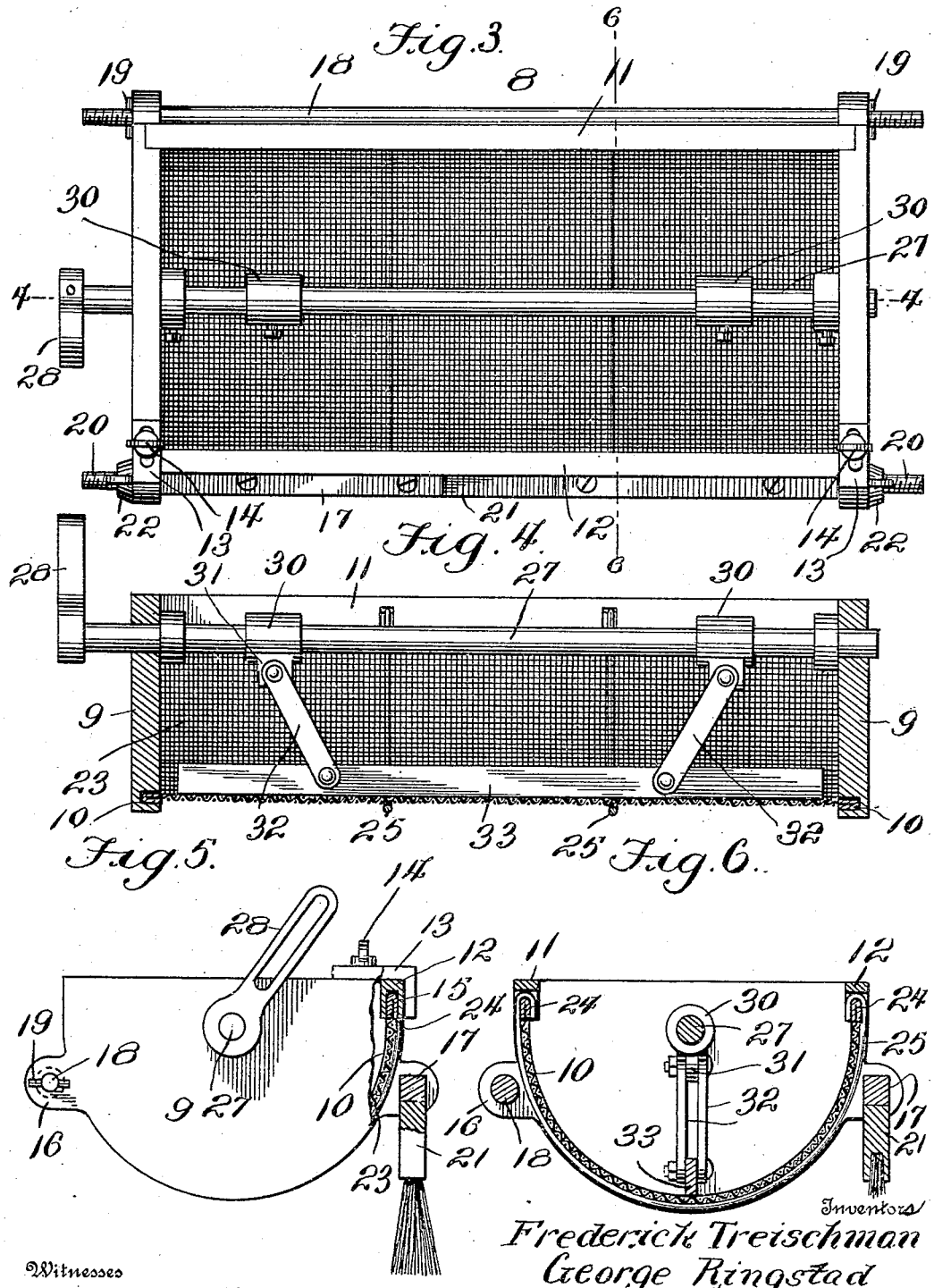

FREDERICK TREISCHMAN AND GEORGE RINGSTAD, OF WADENA, MINNESOTA.

FLOUR-DUSTER.

943,204.  Specification of Letters Patent.  Patented Dec. 14, 1909.

Application filed February 19, 1909. Serial No. 478,853.

*To all whom it may concern:*

Be it known that we, FREDERICK TREISCHMAN and GEORGE RINGSTAD, citizens of the United States, residing at Wadena, in the county of Wadena and State of Minnesota, have invented new and useful Improvements in Flour-Dusters, of which the following is a specification.

This invention relates to a duster attachment for combined bar and sheeting machines, and the object of the invention is to provide a device of this character which may be easily and quickly attached to a dough bar and sheeting machine of any ordinary construction without necessitating the alteration or changing of the parts of the machine.

Another object of the invention is to provide a duster adapted to apply a coating of flour, sugar or other material upon the sheet of dough as it is fed from the machine, the device being provided with a brush adapted to extend transversely of the sheet of dough adapted to level the coating on the dough as it is passed under the brush.

With the above, and other objects in view which will appear as the description progresses, the invention resides in the novel construction and arrangement of parts hereinafter fully described and claimed.

In the accompanying drawings there has been illustrated a simple and preferred embodiment of the invention, and in which, Figure 1 is a perspective view of a combination bar and sheeting machine, showing the improved flour duster in applied position thereon. Fig. 2 is a front elevation of the duster showing a portion of the brush broken away. Fig. 3 is a top plan view of the improvement. Fig. 4 is a longitudinal sectional view upon the line 4—4 of Fig. 3. Fig. 5 is an elevation of the improvement. Fig. 6 is a transverse sectional view upon the line 6—6 of Fig. 3.

In the accompanying drawings the numeral 1 designates a combination bar and sheeting machine of any well known construction commonly employed in bakeries. The machine 1 is provided with the usual belt wheel 2 mounted upon a suitable shaft and provided with a toothed wheel 3, meshing with similar toothed wheels whereby motion is imparted to a rocker arm 4 and to a suitable mixer or agitator and feeding rolls provided within a hopper 5.

The numeral 6 designates the table of the machine which is provided with an endless belt 7 upon which the dough from the hopper 5 is fed outwardly from the machine either in bars or sheets as desired, it being understood that the table 6 may be raised or lowered in relation to the hopper 5 when desired.

Secured to the machine 1, directly above the movable table 6 and at the mouth or outlet of the hopper 5 is the improved dusting apparatus 8. This device 8 comprises a pair of approximately semi-cylindrical end members 9 having their inner faces adjacent their curved edges provided with grooves or depressions 10. The sides 9 have their upper outer edges connected by the longitudinally extending bars 11 and 12. The bar 12 has its ends provided with an offset shoe 13 adapted to overlie the outer portion of the top of the sides 9 and to be secured thereto through the medium of detachable threaded members 14. The members 11 and 12 have their under faces provided with longitudinally extending slots 15, and these slots are adapted to aline with the depressions or openings 10 within the end members 9. The end members 9 are each provided with outwardly extending ears 16 and 17. The ears 16 are adapted for the reception of a longitudinally extending rod 18 which has its outer ends threaded and adapted for the reception of interiorly threaded retaining elements 19 through the medium of which the sides 11 and 12 are securely retained upon the ends 9. The ears 17 are adapted for the reception of trunnions 20 provided upon the longitudinally extending brush member 21. The trunnions 20 of the brush member 21 are suitably threaded and are adapted for the reception of wing nuts 22 which not only securely retain the brush in position upon the device but compress the parts of the latter thereby effectively securing the front portion of the device.

The numeral 23 designates an approximately semi-cylindrical reticulated member. This member 23 is composed of a screen of any desired gage and has its edges provided with reinforcing metallic plates 24. The bars 11 and 12 are provided with supporting members 25 constructed of wire or other suitable straps and of an arcuate formation to correspond with the curved cross sectional contour of the reticulated member 23. These supporting members 25 are adapted to retain the reticulated member 23 in its proper position upon the end members 9 so as to prevent its sagging when an agitator bar, hereinafter to be described is oscillated within the reticulated body. By arranging the brush member 21 with the threaded trunnions 20 and the connecting member 12 with the offset shoes 13 having the detachable securing elements 14, as well as the rod 18 provided with the detachable members 19, it will be noted that the receptacle 8 may have its parts readily separated so as to allow for the insertion within the grooves 10 and 15 of reticulated members of different mesh. The member 8 is provided with a longitudinally extending shaft 27 extending through suitable openings provided in the sides 9. The shaft 27 has one of its projecting ends provided with a slotted arm 28 which is adapted to be connected with a link 29 having its opposite ends secured to the offset portion of the rocker 4 of the machine 1. Secured upon the shaft 27 is a pair of adjustable collars 30 provided with downwardly extending ears 31 which are adapted for pivotal connection with links 32 and which have their opposite ends pivotally connected with a longitudinally extending agitator bar 33. By providing the bar 33 with the links 32 it will be noted that the said links being arranged at an angle between their connection with the bar and the ears of the collars 30, the said bar is at all times forced against the inner face of the arcuate reticulated member 23, and it will be further noted that as the rocker arm 4 of the machine 1 is oscillated motion will be imparted to the link 29 which in turn imparts motion to the shaft 27 and to the agitator bar 33 connected therewith. By this arrangement it will be noted that flour or other coating material adapted to be imparted to the dough delivered upon the endless belt 7 is thoroughly sifted by the reticulated receptacle 23 and also that the brush 21 bearing lightly upon the sheet of dough lays the coating upon the dough evenly and effectively prevents the formation of lumps upon the dough or the feeding of a larger quantity of coating than is desired.

It will be further noted that the duster attachment may be readily raised or lowered to agree with the size of the dough imparted upon the endless belt 7 whether the dough is formed in bars or sheeting without necessitating the alteration or changing of any of the parts of the machine.

Having thus fully described the invention what is claimed as new is:

1. The combination with a dough feeding machine having an oscillated arm adapted to operate the mechanism within the hopper of the machine, of a duster attachment for said machine, said duster comprising a semi-cylindrical reticulated member provided with an agitator, means provided by the rocker arm for oscillating the agitator, and a brush pivotally connected to and extending below the outer face of the duster.

2. The combination with a dough feeding machine having a hopper provided with mechanism operated by a rocker arm and having an outwardly extending endless belt, of a duster, said duster comprising removable side members and a removable semi-cylindrical reticulated member, an agitator arm within the reticulated member, means for forcing the agitator against the inner face of the reticulated member, means connected with the rocker arm of the machine for oscillating the agitator, and a brush member connected with the duster and adapted to be positioned a slight distance above or in contact with the endless belt of the machine.

3. The combination with a dough feeding machine provided with a hopper, a rocker arm connected with levers operating the mechanism within the hopper and having an outwardly extending endless belt, of a flour duster, said duster comprising a pair of semi-cylindrical ends provided with oppositely disposed ears, a reticulated semi-cylindrical body portion between the ends, securing devices connected with the rear ears of the end members, a brush member provided with trunnions connected with the forward ears of the end members, a shaft upon the end member, adjustable collars upon the shaft, inclined links connected with the collars, a longitudinally extending agitator bar pivotally connected with the links and resting upon the inner face of the reticulated member, an offset link upon the shaft, and a connection between the link and rocker arm of the machine.

4. The combination with a dough feeding machine, provided with a hopper and an agitator arm operating the mechanism within the hopper and also having an outwardly extending delivery belt, of a duster, said duster comprising a pair of end members of a semi-cylindrical contour having their inner faces provided adjacent their periphery with channels, said ends being each provided with oppositely disposed slotted ears, upper bars at the outer edges of the tops of said ends provided with longitudinal recesses, a reticulated member for the grooves of the ends and the bars, semi-cylindrical supporting members for the reticulated member, a removable bar connecting the rear ears of the end members, a removable brush provided with trunnions connecting the forward ends of the end members, a longitudinally extending shaft for the end members, slidable collars upon the shaft, links pivoted upon the collars, a longitudinally extending rocker arm pivotally connected with the links, a slotted offset arm upon the shaft, and a slotted link connecting the offset arm and adjustably connected with the rocker arm of the machine.

5. The combination with a dough feeding machine, of a reticulated duster removably secured thereto and provided with an agitator adapted to be oscillated by the operating parts of a machine, said duster being provided with a longitudinally extending brush, substantially as and for the purpose set forth.

In testimony whereof we affix our signatures in presence of two witnesses.

FREDERICK TREISCHMAN.
GEORGE RINGSTAD.

Witnesses:
MAUDE FEEHAN,
FRANK C. FIELD.